United States Patent [19]
Iketani et al.

[11] Patent Number: 5,486,930
[45] Date of Patent: Jan. 23, 1996

[54] APPARATUS FOR RECORDING AND REPRODUCING A VIDEO SIGNAL USING A DIGITAL VIDEO CASSETTE RECORDER

[75] Inventors: Akira Iketani, Higashiosaka; Susumu Ikeda, Kobe; Susumu Yamaguchi, Nishinomiya; Chiyoko Matsumi, Suita; Takayasu Yoshida, Toyono, all of Japan

[73] Assignee: Matsushita Electric Industrial Co., Ltd., Osaka, Japan

[21] Appl. No.: 78,572

[22] Filed: Jun. 16, 1993

[30] Foreign Application Priority Data

Jun. 16, 1992 [JP] Japan .................................. 4-156355
Nov. 27, 1992 [JP] Japan .................................. 4-318240

[51] Int. Cl.$^6$ .............................. H04N 5/76; G11B 5/00; G11B 5/09
[52] U.S. Cl. ............................. 358/335; 360/32; 360/48
[58] Field of Search .................... 358/335, 310, 358/311; 360/33.1, 35.1, 14.1, 14.2, 14.3, 32, 48; 348/478, 477, 476, 479, 480, 481, 482, 483; H04N 5/76, 9/79, 5/92, 7/04

[56] References Cited

U.S. PATENT DOCUMENTS

| | | | |
|---|---|---|---|
| 4,167,759 | 9/1979 | Tachi | 348/478 |
| 4,575,770 | 3/1986 | Dieterich | 348/478 |
| 4,631,603 | 12/1986 | Ryan . | |
| 5,063,456 | 11/1991 | Horiuchi et al. | 348/478 |
| 5,144,453 | 9/1992 | Suga et al. | 358/310 |
| 5,218,454 | 6/1993 | Nagasawa et al. . | |
| 5,237,412 | 8/1993 | Nakajima | 358/335 |

FOREIGN PATENT DOCUMENTS

| | | |
|---|---|---|
| 0141130 | 5/1985 | European Pat. Off. . |
| 0182970 | 6/1986 | European Pat. Off. . |
| 0441702 | 8/1991 | European Pat. Off. . |
| 4104773 | 9/1991 | Germany . |
| 182865 | 3/1989 | Japan .............................. H04N 5/783 |

*Primary Examiner*—Thai Q. Tran
*Attorney, Agent, or Firm*—Ratner & Prestia

[57] ABSTRACT

An apparatus for recording and reproducing a video signal has a recording portion and a reproducing portion. The recording portion has an analog-to-digital converter for converting analog video signal to digital video signal, a wave form data extraction circuit for extracting digital wave form data expressed in 8-bit detail and carried in a vertical blanking period of the video signal, and a converter for converting the digital wave form data to a quantized wave form data expressed in 2-bit detail. The video signal is recorded on a tape together with the quantized wave form data. The reproducing portion has a wave form data selector for selecting the quantized wave form data, a counter converter for converting the 2-bit quantized wave form data to the original digital wave form data of 8-bit detail, and an adder for adding the digital wave form data in a vertical blanking period of the video signal.

8 Claims, 7 Drawing Sheets

APPARATUS FOR RECORDING AND REPRODUCING A VIDEO SIGNAL USING A DIGITAL VIDEO CASSETTE RECORDER

BACKGROUND OF THE INVENTION

1. Field of the Invention

The present invention relates to an apparatus for recording and reproducing a video signal using a device for recording digital video cassette recorder (VCR) and other video signals in a digital format.

2. Description of the Prior Art

As shown in FIG. 3, a video signal consists of three major components: a vertical synchronization signal, vertical blanking period, and the valid video data. The vertical synchronization signal indicates the beginning of the image area, and the vertical blanking period is a blank signal area providing the time required for the scanning mechanism of the television receiver to reset for scanning the next field after scanning one field is completed. The data in this vertical blanking period is therefore not displayed on the television receiver screen. The valid video data includes the normal video signal displayed on the television receiver screen, and a horizontal blanking period, which includes the horizontal synchronization signal.

In a conventional consumer analog VCR, the entire video signal shown in FIG. 3 is recorded to a single diagonal track crossing the video tape as shown in FIG. 4. This is to enable the video to be displayed on the television receiver by simply restoring the video signal from the tape correctly. Conversely, the party recording the tape can superimpose information used for other specific purposes during data playback to this vertical blanking period.

Digital VCRs, which record the video signal in a digital format, have also been developed as a means of recording and reproducing video images with significantly better image quality than is possible with an analog VCR, and to prevent image deterioration through multiple dubbing and editing generations. The problem with digital video, however, is that the digital signal format significantly increases the amount of recorded data compared with analog video. This is because with analog video a single point in the input image is recorded to a single point on the tape. With digital video, however, this same single point in the input image is recorded to eight points on the video tape, assuming an 8-bit digital encoding format.

This increase in tape consumption greatly increases the operating cost, and causes cassette storage problems because of the larger cassette size. These problems are particularly problematic in digital VCRs for consumer use. In addition, the increase in tape consumption significantly impairs the practical utility of the VCR. To reduce tape consumption in digital VCRs for consumer use, the amount of recorded data is actually reduced by eliminating the vertical and horizontal blanking periods, which are not essential to image reproduction, and by removing redundant image components by means of so-called "high efficiency encoding" technologies.

For example, in an NTSC signal, the valid video data accounts for approximately 80% of the total signal. By simply eliminating the blanking period, total tape consumption can therefore be reduced approximately 20%. It is to be noted that while only valid video data is recorded in a digital VCR, the horizontal synchronization signal, video synchronization signal, and horizontal and vertical blanking periods required for normal video signal playback are output by a separate means during video reproduction. In digital VCRs in which all processing is digital, this additional processing is simple and imposes no meaningful overhead.

An error correction signal is also recorded with the video and audio signals in a digital VCR in order to correct signal errors during playback. Because this error correction signal also increases the amount of information recorded, total tape consumption is further increased. In a consumer digital VCR, it has been impossible to record the video signal blanking period to tape because of the need to record essential information such as the error correction signal, and the need to prevent any further increase in total tape consumption.

All apparently extraneous information is therefore removed from the signal recorded in a conventional digital VCR for consumer use, thereby overcoming the increase in tape consumption that would be fatal to widespread consumer acceptance. Unfortunately, this approach introduces the following major problems.

While the vertical blanking period has no specific value for the video information because it is not displayed on screen, it is extremely valuable for practical VCR control, video signal adjustment, and other complementary applications. For example, in a component signal VCR in which the luminance signal and two color difference signals are separately input and output, the signals are converted to analog signals when output to the television receiver even in VCRs in which all recording and signal processing is digitally processed. The signals are then processed by separate analog circuits.

The delay time of the analog processing circuits is not uniform and may vary greatly between circuit components. In the case of consumer VCRs, high precision circuits are not used because of the need to reduce costs, and the tendency toward variations between circuit components is even greater. The same is true for data recording. Analog input signals are processed by analog circuits until they are converted to digital signals by the A/D converter, and the delay time of each analog circuit component differs. When the signals are separately delayed by the analog circuits, shifts in luminance and color appear on screen. These shifts increase as the variation in the circuit components increases. Once the signals shift, the luminance and color shift continues without bound because there is no reference for restoring the signals. Because there are also shifts in the same color, the quality of the image reproduced by this process becomes completely unacceptable.

While there is room to superimpose information for adjusting this delay time, for example, in the vertical blanking period, there is no place to record this superimposed data in this period in a conventional digital VCR for consumer use. In effect, the quality of the playback image is unusable in practical terms, despite using a digital recording format in pursuit of high image quality, because the recording format cannot effectively use this vertical blanking period. To resolve this problem in hardware alone requires the use of extremely high cost, high precision analog components, significantly increasing the unit cost. This is therefore a major impediment to the market viability of a digital VCR for consumer use.

SUMMARY OF THE INVENTION

Therefore, an object of the present invention is to enable the effective use of the vertical blanking period removed from the conventional digital VCR as described above. Specifically, the blanking period wave form is efficiently encoded by a process different from that used in the normal video period, and is recorded to a dedicated part of the tape equivalent to ≦0.1% of total tape capacity. During playback, a wave form is superimposed to the blanking period based on this data.

In addition, the present invention can select the vertical blanking period information for the video as recorded to tape, and can easily generate in another VCR using the invention the recorded wave form for the vertical blanking period. A characteristic of this invention is that it can be used for various applications, including adjusting the delay time of each signal component, and automatically adjusting video signal gain and frequency characteristics when the video signal is recorded with component signals, for example. This invention is furthermore not limited to digital VCRs, and provides practical effects in all digital video recording apparatuses recording video signals in a digital state, including digital video disc players.

BRIEF DESCRIPTION OF THE DRAWINGS

The present invention will become more fully understood from the detailed description given below and the accompanying diagrams wherein.

DESCRIPTION OF PREFERRED EMBODIMENTS

First Embodiment

Figure 5:
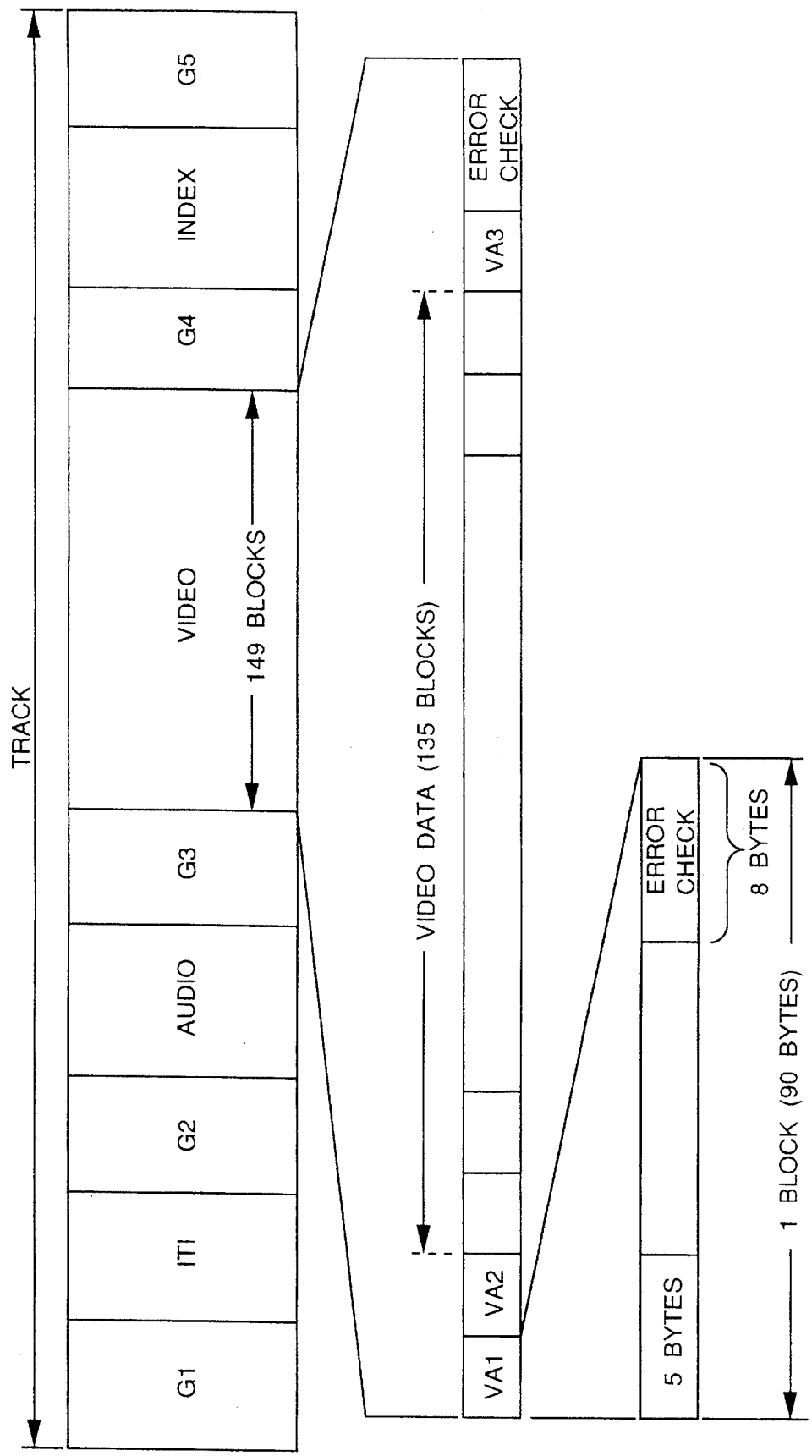
FIG. 5 illustrates the recording state of the data structure for a single track in a digital VCR employed in the present invention.

An example of the track pattern recorded according to the first embodiment of the invention is shown in FIG. 5. The track pattern is the data stream recorded to tape with one pass of one head. Referring to FIG. 5, the track starts with the mechanical margin G1, a margin provided to prevent the loss of valid data following the mechanical margin G1 due to vibration of the cylinder carrying the head. Similar margins G2, G3, G4 and G5 are provided to separate different types of information. Data for generating the tracking information used to precisely track the head to the track center is recorded to the ITI (Insert and Tracking Information) period. Data for maintaining the precision of the data rewrite position is also included in the ITI period.

The audio signal and error correction signal are recorded to the AUDIO period. The normal video data is recorded to the VIDEO period, which may also include character data and the wave form data superimposed to the vertical blanking period, and error correction signals for the data recorded to the VIDEO period. A time code, program start, and/or other information for data searching is recorded to the INDEX period.

In a digital VCR for consumer use (a "consumer VCR" below), a normal video signal may record the video information for one frame using ten tracks, for example. In general, 10,000–15,000 bytes are recorded to one track in a consumer VCR.

The structure of the VIDEO period described above is also shown in detail in FIG. 5. The VIDEO period comprises 149 small blocks in which the first two blocks are for the first and second video auxiliary areas VA1 and VA2. Then follows 135 blocks for the video data. After the video data, the 138th block which is for the third video auxiliary area VA3 and error check blocks are provided. Each block is 90-bytes long, of which the first five bytes are for identifying the starting position of each block and for holding a block number data, the last eight blocks are for parity check data, and intervening 77 bytes are for storing data. The video auxiliary blocks VA1, VA2 and VA3 are used for storing control data, wave form data and character data, so that a 231 byte area (=77×3) is provided for control, character and wave form data. According to the embodiment disclosed herein, it is assumed that the video auxiliary blocks VA1, VA2 and VA3 are allocated to control data, wave form data and character data, respectively.

An example of the character data is a teletext data which is superimposed in a certain area in the vertical blanking period in the broadcasted television signal.

An example of the wave form data is a pulse wave form data expressing the ON/OFF state such as for controlling the delay time adjustment, and is also superimposed in a certain area in the vertical blanking period. Here, the ON state may be expressed by a pulse having a level equal to white level (254), and the OFF state may be expressed by a flat level equal to black level (1). In this case, it is also necessary to determine whether the ON/OFF state wave form added to the vertical blanking period is a wave form superimposed for a particular purpose or not. As a result, the superimposed wave form data is quantized to 2-bit data ($v_1$, $v_0$). In effect, one sample of the wave form data superimposed to the vertical blanking period is expressed by 2 bits ($v_1$, $v_0$) in the present invention, resulting in four levels as shown in Table 1.

TABLE 1

| ($v_1$, $v_0$) (2 bit) | Level No. | Superimposed level (8-bit value) |
|---|---|---|
| (0, 0) | 0 | Black (1) |
| (0, 1) | 1 | Gray (128) |
| (1, 0) | 2 | White (254) |
| (1, 1) | 3 | Synchronization level (*) |

Note: "*"indicates no corresponding value.

Superimposition wave level 0 is the black level corresponding to a normal black video signal. The black level is normally the lowest signal level in a digital video signal. Level 2 is the white signal level, corresponding to a signal value of 255 for an 8-bit video signal wherein black is 0. It is to be noted that some 8-bit digital video signal systems define the minimum signal level as 1 and the maximum signal level as 254. As a result, if the present invention is applied in such an 8-bit digital video signal system, black is 1 and white is 254.

Level 1 in Table 1 corresponds to an intermediate level between black and white. In an 8-bit video signal system, this level value is 128. Level 4 is the synchronization pulse level. This level is used when it is necessary to determine whether the wave form superimposed to the vertical blanking period is a product of this invention or not.

It is to be noted that this synchronization level is the same level as the normal horizontal synchronization signal. In a normal digital VCR, analog/digital conversion is applied only to signal levels greater than black, and the synchronization level is not subject to A/D conversion. There is therefore no value expressing the synchronization level, and the synchronization level is processed separately to the video signal during signal reproduction in a digital VCR. The synchronization level of the present invention can therefore be similarly reproduced using the same processing circuits with no problems.

Various types of data are often superimposed to the vertical blanking period of broadcast waves by public broadcasters. Due to the broadcasting standards, however, this superimposition data cannot necessarily be used as the synchronization level. Therefore, synchronization level data appearing in any place other than the standard synchronization signal in the playback signal of a digital VCR recording such broadcast waves can be identified as being added by the present invention.

If the synchronization level is not present, it is difficult to select and record only the wave superimposed by the invention when a signal comprising a wave superimposed to the vertical blanking period by the present invention is recorded by another digital VCR also incorporating this invention. This is because there are cases in which some other wave is superimposed to the vertical blanking period of the broadcast wave or other signal, and there is nothing to distinguish these waves and the wave superimposed by the invention.

It is therefore possible in the present invention to use the synchronization level for the superimposed wave. Therefore, when there is a need to selectively record a wave superimposed by the present invention, the receiver can recognize a synchronization level appearing at some point other than the normal synchronization level as the beginning of the wave superimposed by the present invention, and can thus record only this wave, by, for example, always recording the synchronization level to the beginning of the superimposed wave.

The smallest control unit of a wave superimposed by the present invention is equal to one horizontal period of the video signal. One horizontal period comprises the horizontal synchronization signal and the approximately 50 μsec blank signal period following thereafter, and has a fixed length of approximately 64 μsec in the NTSC signal format. The vertical blanking period of the video signal is generally equivalent to 10–20 horizontal periods. In the present invention, an area for recording wave form data superimposed to one horizontal period of the vertical blanking period is reserved in one digital VCR track.

However, the appropriate number of data superimposed to one horizontal period is a maximum 50. This is derived from the following:

(1) The minimum time resolution of the superimposed wave is at least 1 μsec; and
(2) To prevent misoperation of the television receiver, data cannot be superimposed immediately after the horizontal synchronization signal, and the time actually available for wave superimposition is approximately 48 μsec.

Therefore, the wave form data that can be superimposed to one horizontal period is 96 bits (=48×2)=12 bytes, at maximum. The present invention is described below based on a wave form data size of 12 bytes, but it is to be noted that any other size, such as 11 byte size data can be employed.

One additional information data of one byte size is added to the 12-byte wave form data, one byte of additional wave form data is added. As a result the amount of data recorded to superimpose the vertical blanking wave is 13 bytes per track, an amount less than 0.1% of the total data amount recorded to one track. The information data contains, such as, data for controlling whether or not a wave is superimposed, the wave form data type, and address data for the position of the horizontal period in the vertical blanking period. The detail of such data in the information data will be described in detail below in connection with Table 2.

TABLE 2

| Bit position | Data | Meaning |
|---|---|---|
| b7 | 0 | Wave not superimposed |
|  | 1 | Wave superimposed |
| b6 | 0 | Tv = 14T |
|  | 1 | Tv = 1T |
| b5,b4 | 00 | Luminance (Y) |
|  | 01 | Color difference (R-Y) |
|  | 10 | Color difference (B-Y) |
|  | 11 | Luminance (Y) & color difference (R-Y/B-Y) |
| b3,b2,b1,b0 | 0000 | Superimpose on 10 and 272 H-sync periods |
|  | 0001 | Superimpose on 11 and 273 H-sync periods |
|  | 0010 | Superimpose on 12 and 274 H-sync periods |
|  | 0011 | Superimpose on 13 and 275 H-sync periods |
|  | 0100 | Superimpose on 14 and 276 H-sync periods |
|  | 0101 | Superimpose on 15 and 277 H-sync periods |
|  | 0110 | Superimpose on 16 and 278 H-sync periods |
|  | 0111 | Superimpose on 17 and 279 H-sync periods |
|  | 1000 | Superimpose on 18 and 280 H-sync periods |
|  | 1001 | Superimpose on 19 and 281 H-sync periods |
|  | 1010 | Superimpose on 20 and 282 H-sync periods |
|  | 1011 | Superimpose on 21 and 283 H-sync periods |
|  | 1100 | Superimpose on 22 and 284 H-sync periods |
|  | 1101 | Not used |
|  | 1110 | Not used |
|  | 1111 | Not used |

The meaning of each bit in the information data is shown in Table 2. Of the eight bit data, (b7 b6 b5 b4 b3 b2 b1 b0) in Table 2, the most significant bit is bit b7, and the least significant bit is bit b0. Bit b7 is the bit for controlling wave superimposition, and is required when there is no wave form data or when there is wave form data but there is no wave superimposition. Bit b6 is for indicating the sampling interval of the wave form data. Time T is approximately 70 nsec (=1/13.5 MHz), and is equal to the sampling interval for the video signal luminance component. This sampling frequency (=13.5 MHz) is found in all normal digital VCRs, and can be generated with no practical problems. In Table 2, Tv=14 T indicates that the superimposition wave sampling frequency is 14×T=approx. 1 μsec.

Bits b5 and b4 indicate the type of wave superimposition. Bits b3, b2, b1 and b0 are for specifying the horizontal synchronization periods in the vertical blanking period of wave superimposition.

Thus, for example, when bits b5 and b4 are (01), and when bits b3–b0 are (0010), the wave form superimposed in the 12 and 274 H-sync periods will be used for controlling the color difference (R-Y). Because it is not necessary to change the superimposition wave in each field of the video signal, the same wave is superimposed to the two fields of one video frame. It is to be noted that some numbers are not used in an NTSC signal because there are not 16 horizontal periods in the vertical blanking period.

In the case of the PAL signal format used primarily in Europe, however, all horizontal periods cannot be expressed with just 4 bits because there are more than 16 horizontal periods in the vertical blanking period. However, it is not necessary to write data to all vertical blanking periods, and there are no practical problems with the specifications of the present invention as described above. The wave form data for the PAL format is shown in Table 3. The only difference between this data and the NTSC data shown in Table 2 is the correspondence between bits b3–b0 and the superimposed horizontal periods. All other specifications are the same, including the sampling interval (bit b6).

| Bit position | Data | Meaning |
| --- | --- | --- |
| b7 | 0 | Wave not superimposed |
|  | 1 | Wave superimposed |
| b6 | 0 | Tv = 14T |
|  | 1 | Tv = 1T |
| b5,b4 | 00 | Luminance (Y) |
|  | 01 | Color difference (R-Y) |
|  | 10 | Color difference (B-Y) |
|  | 11 | Luminance (Y) & color difference (R-Y/B-Y) |
| b3,b2,b1,b0 | 0000 | Superimpose on 6 and 319 H-sync periods |
|  | 0001 | Superimpose on 7 and 320 H-sync periods |
|  | 0010 | Superimpose on 8 and 321 H-sync periods |
|  | 0011 | Superimpose on 9 and 322 H-sync periods |
|  | 0100 | Superimpose on 10 and 323 H-sync periods |
|  | 0101 | Superimpose on 11 and 324 H-sync periods |
|  | 0110 | Superimpose on 12 and 325 H-sync periods |
|  | 0111 | Superimpose on 13 and 326 H-sync periods |
|  | 1000 | Superimpose on 14 and 327 H-sync periods |
|  | 1001 | Superimpose on 15 and 328 H-sync periods |
|  | 1010 | Superimpose on 16 and 329 H-sync periods |
|  | 1011 | Superimpose on 17 and 330 H-sync periods |
|  | 1100 | Superimpose on 18 and 331 H-sync periods |
|  | 1101 | Superimpose on 19 and 332 H-sync periods |
|  | 1110 | Superimpose on 20 and 333 H-sync periods |
|  | 1111 | Superimpose on 21 and 334 H-sync periods |

However, in most cases it is not necessary for the wave superimposed to the vertical blanking period in a digital VCR to be different in each video frame. For example, it is easy to conceive of cases in which a single wave is sufficient throughout a single television program recorded with digital VCR. In such cases, the same wave form data is recorded to all ten tracks comprising one frame, and it is also possible to change the wave form data each frame.

In this case, if the horizontal period number H of the superimposed wave and the superimposed wave form data are obtained once, and this wave is superimposed to the horizontal period H, the same wave is superimposed to horizontal period H in each frame until this horizontal period number H and the superimposed wave form data are next obtained. As a result, a significant margin in the processing speed is obtained because data processing of the superimposed wave normally executed every track can be processed just once per frame.

In addition, while there are ten tracks per frame in the NTSC format, it is necessary to change the processing unit for wave superimposition according to the video signal format when track unit processing is required because there are twelve tracks per frame in the PAL format. It is also necessary to avoid the additional overhead caused by such changes in processing in low-priced digital VCRs for which cost reductions are essential. In such cases it is sufficient to record the same wave form data and information to each track of a single frame, and change the wave form data and information each frame.

Figure 1:
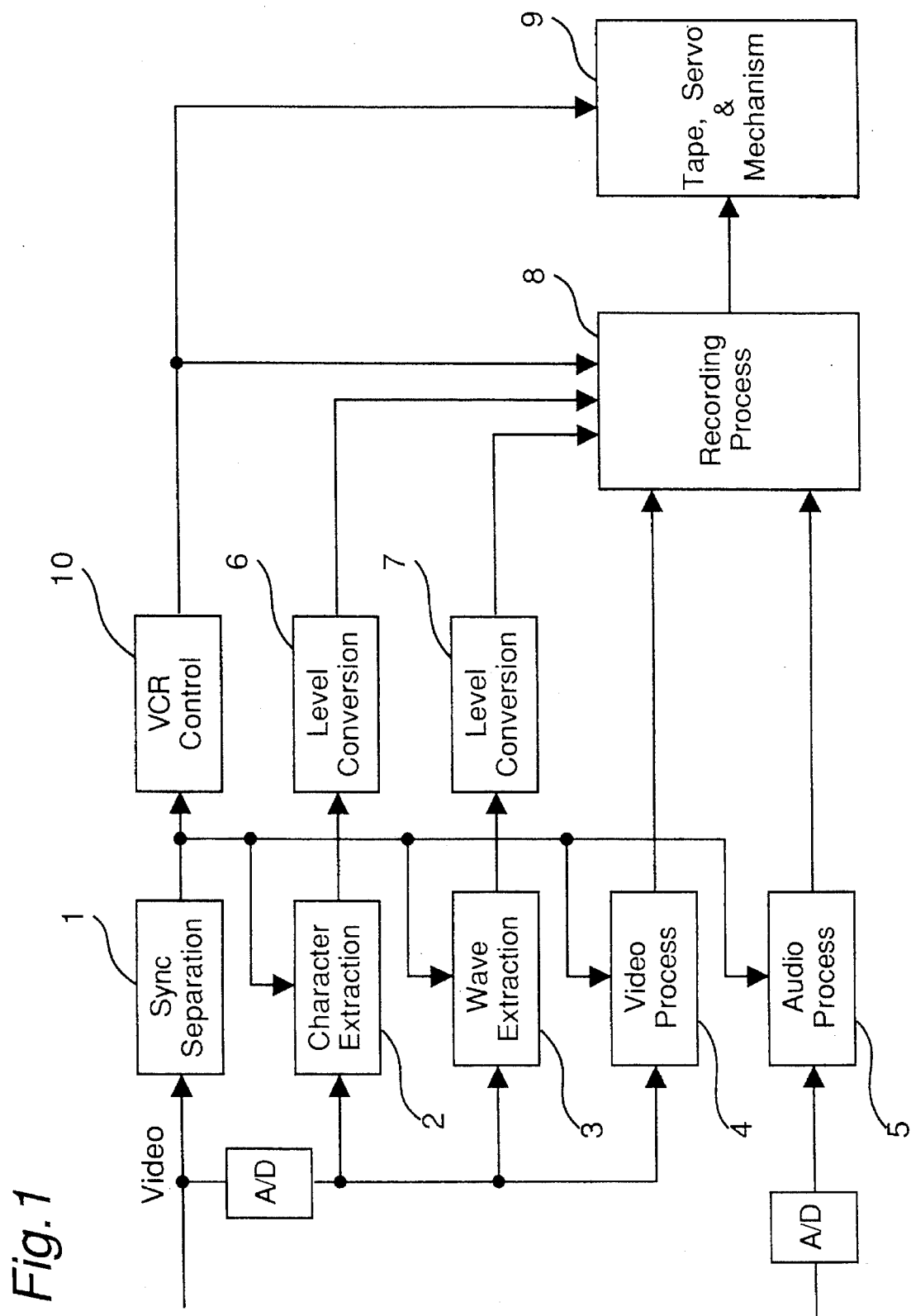
FIGS. 1 and 2 show a block diagram of a recording and reproducing apparatus according to the first embodiment of the invention.
Figure 2:
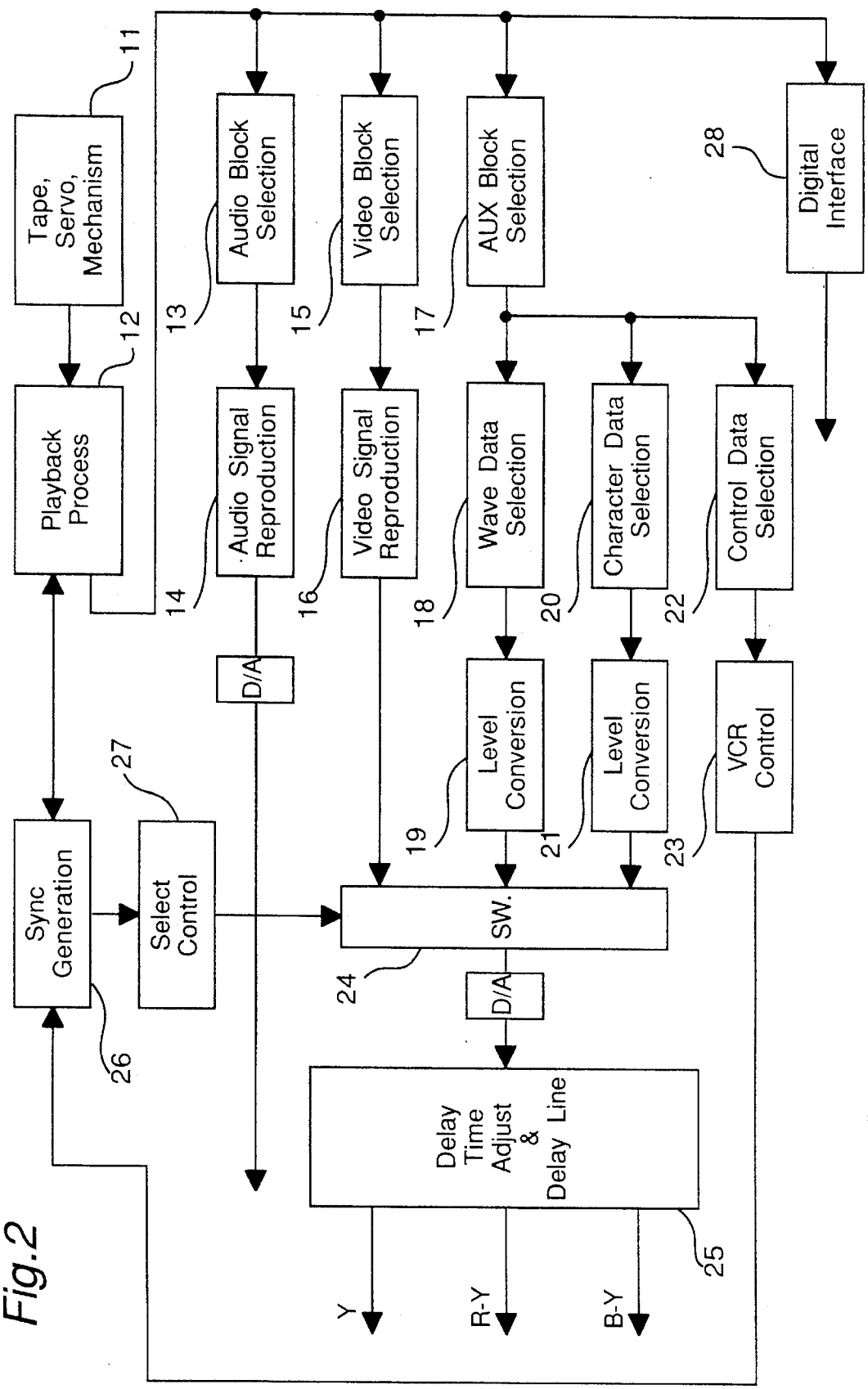
Figure 3:
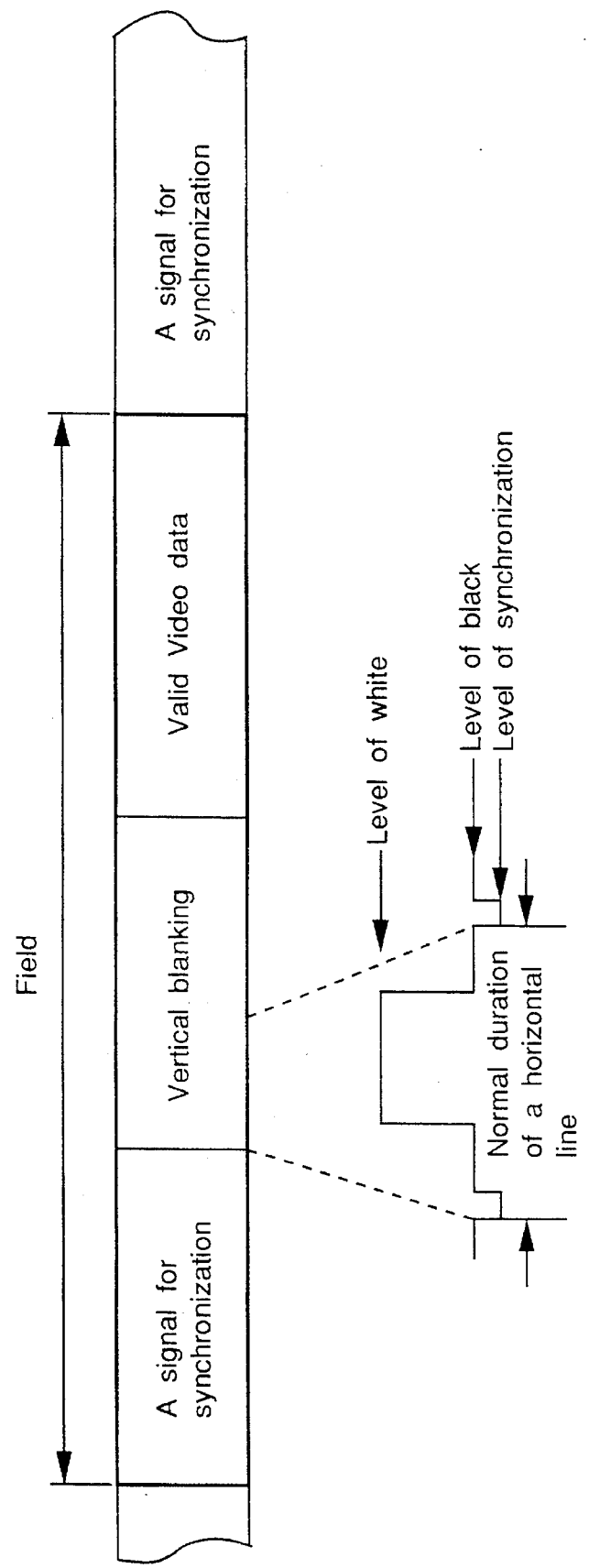
FIG. 3 illustrates the structure of the video signal according to the prior art.
Figure 4:
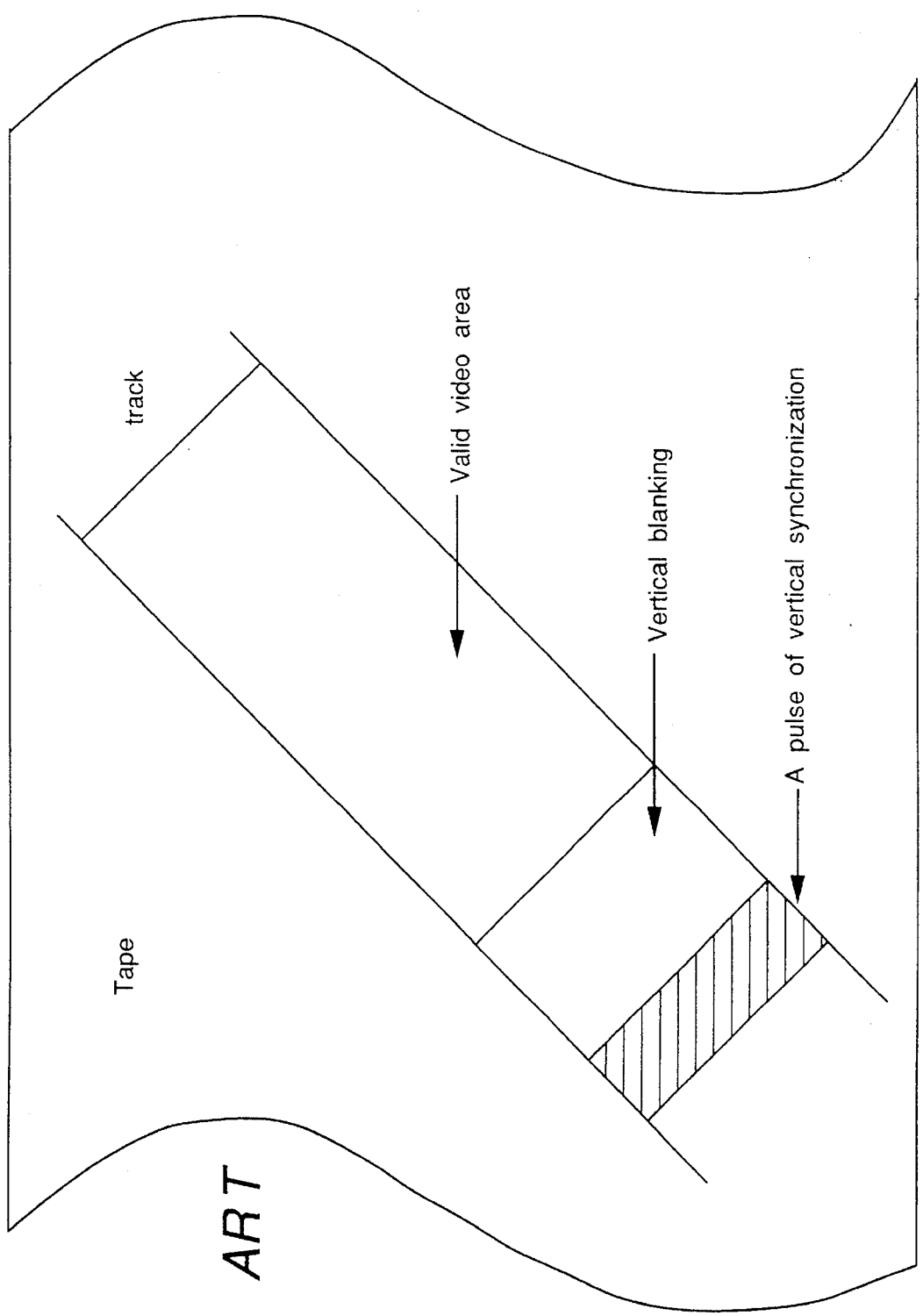
FIG. 4 illustrates the recording state of a video signal in a conventional analog VCR.

An apparatus according to the present invention for recording and reproducing the track pattern of FIG. 5, and for superimposing the wave form on the vertical blanking period is described below with reference to FIGS. 1 and 2 in which FIG. 1 shows the recording portion and FIG. 2 shows the reproducing portion.

Referring to FIG. 1, the recording portion of the apparatus includes a sync separation circuit 1 for separating H-sync and V-sync pulses from the analog video signal and for producing a timing signal applied to a VCR control 10. The analog video signal is also input to an analog-to-digital converter A/D in which the analog video signal is converted, e.g., to 8-bit digital data, and further to each of character extraction circuit 2, wave extraction circuit 3 and video processor 4.

In the character extraction circuit 2, the character data such as teletext data superimposed in the vertical blanking period is extracted. The extracted 8-bit character data is applied to a level converter 6 which converts 8-bit character data to 2-bit data according to Table 1.

In the wave extraction circuit 3, wave data such as luminance data superimposed in the vertical blanking period is extracted. The extracted 8-bit character data is applied to a level converter 7 which converts 8-bit wave form data to 2-bit data according to Table 1.

According to the present invention, the digital character data from circuit 2 and the digital wave form data from circuit 3 have a maximum level expressed in n-bits, such as 8-bits as explained in the above example. Furthermore, according to the present invention, the digital character data and wave form data are converted, respectively, in converters 6 and 7, to quantized character data and quantized wave form data having a maximum level expressed in m-bits, such as 2-bits as explained in the above example.

The timing for extracting the character data and the wave data is controlled by the timing signal produced from the sync separation circuit 1.

In the video processor 4, VCR control data is formed, and also the 8-bit digital video data is packed in blocks, as shown in FIG. 5.

The recording portion of the apparatus further includes an audio processor 5 which receives A/D converted audio signal which is packed in a block, as shown in FIG. 5. A recording processor 8 is provided which receives quantized 2-bit character data from level converter 6, quantized 2-bit wave form data from level converter 7, blocks of video data from video processor 4 and block of audio data from audio processor. A recording processor 8 further receives a control signal from a VCR control 10 so as to control the timing for aligning the various data blocks.

Thus, in the recording processor 8, data from blocks 4, 5, 6 and 7 are gathered and aligned according to the format shown in FIG. 5. According to the embodiment disclosed herein, it is assumed that the VCR control data from video processor 4 is placed in the video auxiliary block VA1, quantized 2-bit wave form data from level converter 7 is placed in the video auxiliary block VA2 and quantized 2-bit character data from level converter 6 is placed in the video auxiliary block VA3. To which one of the video auxiliary blocks where the 2-bit data is stored is given merely as an example, and can be varied according to various formats.

The data aligned in a manner shown in FIG. 5 is produced from recording processor 8 and is recorded along tracks on a recording tape by a tape servo mechanism 9. The signal applied to the mechanism 9 from VCR control 10 controls the speed of rotation of a cylinder carrying recording heads.

A detail of recording processor 8 is disclosed in U.S. Pat. No. 4,353,098 issued to Heinz et al., which is incorporated herein by reference.

Referring to FIG. 2, the reproducing portion of the apparatus includes a tape servo mechanism 11 for reading data on the tracks, a playback processor 12 for correcting errors introduced during the reproducing process and performing other signal processing operations. The reproduced signals are applied to audio block selector 13, video block selector 15 and aux block selector 17 at which the audio blocks, video blocks and video aux blocks, are separated, respectively. This can be done by checking a block number added at beginning of each block.

The reproduced signals are also applied to a digital interface 28 which is for transmitting wave form data according to the present invention together with digital video signals. It is to be noted that the digital video signal interface is not limited to the CCIR format, and another possible format is sending and receiving video signals in a bit rate reduction format. In this case, it is also necessary to transmit the wave form data according to the present invention.

The audio blocks from the audio block selector 13 are applied to an audio signal reproducer 14, and in turn to an digital-to-analog converter D/A and further to an audio playback circuit (not shown).

The video blocks from the video block selector 15 are applied to a video signal reproducer 16 and further to a multiplexer 24.

The video auxiliary blocks VA1, VA2 and VA3 from the aux block selector 17 are applied to control data selector 22, wave form data selector 18 and character data selector 20, respectively.

The quantized wave form data from wave form data selector 18 is applied to a level converter 19 which converts quantized 2-bit data to original 8-bit wave form data according to Table 1, i.e., to the level of the video data. In other words, the conversion carried out in level converter 19 is the opposite conversion to the conversion carried out in level converter 7.

Similarly, the quantized character data from character data selector 20 is applied to a level converter 21 for the conversion from quantized 2-bit data to 8-bit character data according to Table 1.

According to the present invention, the quantized character data from selector 20 and the quantized wave form data from selector 18 have a maximum level expressed in m-bits, such as 2-bits as explained in the above example, and the character data and the wave form data after the level converters 21 and 19, respectively, are returned back to original character data and original wave form data having a maximum level expressed in n-bits, such as 8-bits as explained in the above example.

Thus, the three levels other than the synchronization level are converted to the corresponding video level based on the 2 bits/sample wave form data reproduced from the tape. A synchronization level generating signal specifying the synchronization level is output for the synchronization level. In the case of character data, for example, character data values of 0 and 1 are converted to black and white video signal levels, respectively. It is assumed here that character data is recorded to tape in a binary format.

The playback signal for the ITI period is input to a tracking controller which has a sync generator 26 and is used for precise tracking control. The control data from control data selector 22, as well as the index data, is input to the VCR controller 23, and is used for VCR control, including tape forwarding and stopping, during search modes, for example.

The video data from the video signal reproducer 16, the wave form data from the level converter 19, and the character data from the level converter 21 are applied to a multiplexer 24 which inserts the vertical blanking periods by the control of select control 27 and superimposes the wave form data to the vertical blanking period of the playback video signal, such as for the luminance component. Also, the character data are superimposed to the vertical blanking period. Furthermore, in multiplexer 24, the synchronization levels are added to the video signal after wave superimposition based on the normal synchronization signal generator pulse output from the video reproducer 16. The synchronization level is outputted from the level converter 19.

The signal from the multiplexer 24 including such as the vertical blanking waves and the two color difference signals are applied to a digital-to-analog converter D/A and further input to the delay time adjuster 25.

The delay time adjuster 25 obtains for each of the two color difference signals, a delay time which is a difference between color difference signal and the rise of the luminance signal. The delay time is made equal to the earliest signal, and then outputs the respective time differences to coincide the luminance and color signals, thus automatically adjusting the luminance and two color difference signals for a single point on screen to virtually the same position.

The present invention can thus adjust the delay time of the analog outputs of the component video signal, a major problem in conventional digital VCRs. It is to be noted that this function demonstrates only one effect of the invention, and many other benefits are also obtained.

It is to be noted that while this embodiment has been described with reference to an analog video signal, it is also necessary to add character data and wave form data to the normal video data in the case of digital inputs and outputs for transmission. If the wave form data according to the present invention cannot be transmitted with a digital interface, this will be a result of the following problems. It is assumed below that the wave form data was recorded through an analog interface, and this wave form data includes, for example, the delay time information for the luminance signal and color signals.

If just the video signal is then transmitted through a digital interface, the delay time information for the luminance signal and color signals included in the video signal will be lost, and the problems inherent in the conventional digital VCR addressed by the present invention cannot be resolved. In addition, because it is easily conceivable that all VCRs will not have a digital interface, video signal transmission can be expected to continue through analog interfaces for some time in the future.

Therefore, to effectively apply the present invention, it is necessary for the digital interface of the VCR to also have the ability to send and receive wave form data according to the present invention. It is to be noted that in the CCIR format, which is a known video signal digital interface, there is a specific transmission area for sending and receiving wave form data, and the present invention can be actively applied using this area.

The digital interface 28 in FIG. 2 is a circuit for transmitting wave form data according to the present invention together with digital video signals. It is to be noted that the digital video signal interface is not limited to the CCIR format, and another possible format is sending and receiving video signals in a bit rate reduction format. Digital interface 28 used in FIG. 2 is for the latter case. In this case, it is also necessary to transmit the wave form data according to the present invention.

As described hereinabove, the present invention can efficiently record superimposed wave form data to the vertical blanking period. As a result, tape consumption is not increased, fulfilling one essential requirement of a consumer digital VCR, and functions that cannot be realized with a conventional digital VCR, including automatic adjustment of the delay times of the luminance signal and two color difference signals, can be achieved.

Second Embodiment

In this embodiment, copy enable information and number of copies limit information is superimposed to one horizontal period of the vertical blanking period. A block diagram of this apparatus is shown in FIG. 6.

Figure 6:
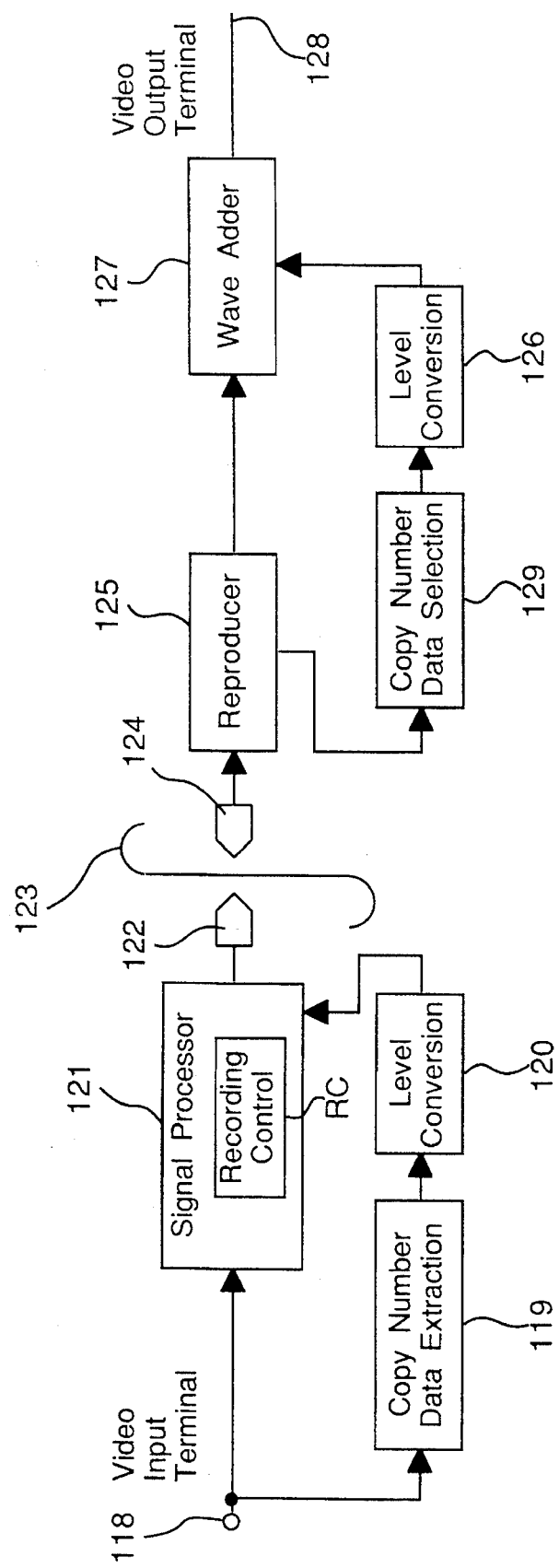
FIG. 6 is a block diagram of the second embodiment of the invention.
Figure 7A:
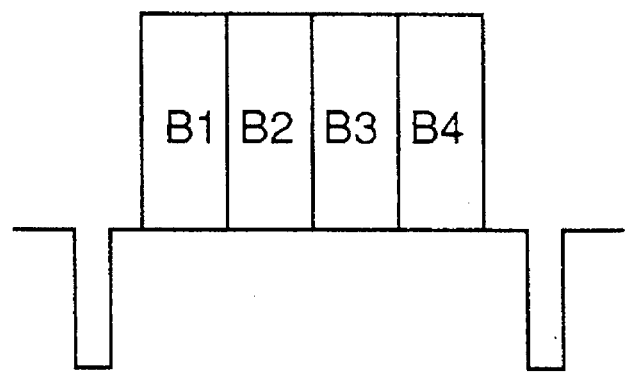
FIGS. 7a and 7b are wave forms used to describe the second embodiment of the invention.

Copy enable information and number of copies limit information (i.e., copy number data) is superimposed (FIG. 7a) to the video signal input to the video input terminal 118 (FIG. 6). The digital copy number data is preferably following by a synchronization level signal. In FIG. 7a, the copy enable information and number of copies limit information are indicated as B1–B4, and the video signal level is a binary expression (i.e., black and white video signal levels are expressed as 0 and 1, respectively).

Figure 7B:
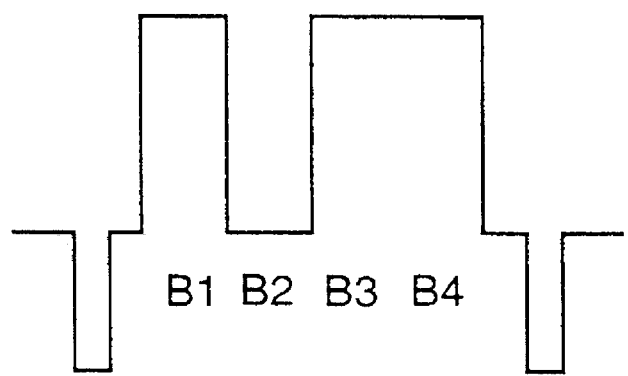

In this example, copying is enabled when bit B1 is zero (0), and copying is disabled when B1 is one (1). Bits B2, B3, and B4 express the number of copies where B2 is the most significant bit and B4 is the least significant bit. Thus, if bit values (B2, B3, B4) are (0, 1, 1), as shown in FIG. 7b the video signal has been copied three times.

The video signal input to the video input terminal 118 (FIG. 6) is input to the copy number data extraction circuit 119 whereby the copy enable data, as well as the data indicating the number of copies already made, superimposed to one horizontal period of the vertical blanking period is extracted. The extracted information is input to the level converter 120, which is similar to the level converter 7 described above in connection with FIG. 1. The quantized copy number data is applied to a signal processor which has a recording control RC. The recording controller RC outputs a control signal either enabling or disabling copying. It is to be noted that the signal processor 121 further has the video processor 4, audio processor 2, and recording processor 8 shown in FIG. 1.

If copying is enabled, i.e., B1=0, and the number of copies (B2, B3, B4) (=N) is less than the copy limit, the number of copies (B2, B3, B4) is incremented one (=N+1) in the recording controller RC, and the renewed bits (B1, B2, B3, B4) are recorded to magnetic tape 123.

During reproduction, the playback signal reproduced by the magnetic head for reproduction 124 is first input to the reproducer 125 for correction of errors occurring during the reproduction process. The corrected signal is then input to the copy number data selection circuit 129 for selecting the quantized copy number data (B1, B2, B3, B4), and the quantized data is converted to the original video signal level (0→black, 1→white) in level converter 126. In addition, the corrected reproduction signal is restored to video and audio signals by the reproducer 125. Note that the reproducer 125 further has the playback processor 12, audio reproducer 14, and video reproducer 16 shown in FIG. 2.

It is to be noted that the magnetic head for recording 122 and the magnetic head for reproduction 124 are herein separated for ease of description, but a single magnetic head is commonly used for both recording and reproduction, and the present invention does not require discrete magnetic heads for recording and reproduction.

In the wave adder 127, the (B1, B2, B3, B4) bits converted to the video level (i.e., the (B1, B2, B3, B4) bits converted to 0 for black and 1 for white) input from the level converter 126 are superimposed to the vertical blanking period of the restored video signal. The result of the superimposition process is then converted to an analog video signal, and output from the video output terminal 128. As a result, the number of copies (=N+1) of the reproduced video signal is expressed by the superimposed bits (B2, B3, B4).

If the copy enable bit B1 is 1 and the number of copies limit information B2–B4 is greater than or equal to the limit value, the recording controller RC generates the copy prohibit signal. The signal processor 121 receiving the copy prohibit signal stops all copying operations. It is thus possible to limit the number of copies possible with an analog video input/output in a VCR using the present invention.

It is to be noted that copy enable and copy number information is used as the copy information in this embodiment by way of example, but this embodiment shall not be so limited. For example, if it is assumed that the position to which this copy information is superimposed (any horizontal synchronization period in the vertical blanking period) is any selected position, the superimposed information must include, in addition to the copy information, a marker indicating that the superimposed information is the copy information.

In other words, a specific bit pattern of M bits is superimposed as the marker, and the copy information (B1, B2, B3, B4) is then superimposed. This marker is thus first detected before the process extracting the copy information starts. This marker detection can be easily achieved in the copy number data extraction circuit 119 (FIG. 6). However, the marker information does not need to be recorded to tape because it is already known. A function for superimposing this marker before superimposing the copy information during data reproduction must be provided in the level converter 126 (FIG. 6).

Bits (B2, B3, B4) are also described as the copy number information in this embodiment, but it is not necessary to use three bits to express the copy number information. Any required number of bits can be assigned as appropriate for the system. It is also possible to assign one bit as the copy enable information, the number of copies as bit A, and the copy limit information as bit C, and to enable copying until copy number A is equal to or greater than copy limit C. In this case, bits 1, A, and C are recorded to tape.

Finally, the invention described above is not limited to recording to a magnetic tape medium, and can be used with equal effectiveness in an optical disk or other digital video signal recording and reproducing apparatus.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for recording and reproducing a video signal comprising:

(I) recording arrangement comprising:

analog-to-digital conversion means for converting analog video signal to digital video signal;

wave form data extraction means for extracting non-character digital wave form data having a predetermined number of different levels carried in a vertical blanking period of said video signal, said non-character digital wave form data having a maximum level expressed in n-bits;

first conversion means for converting said non-character wave form data to one of a predetermined number of different quantized wave form data having a maximum level expressed in m-bits, in which m is not greater than n; and recording processing means for recording video signal together with said predetermined number of different quantized wave form data on a recording medium in a predetermined format; and (II) reproducing arrangement comprising:
reproducing processing means for reproducing said video signal from said recording medium;
wave form data selecting means for selecting said predetermined number of different quantized wave form data;
first counter conversion means for converting said predetermined number of different quantized wave form data of m-bits to said non-character digital wave form data of n-bits; and
adder means for adding said non-character digital wave form data in a vertical blanking period of said video signal.

2. An apparatus as claimed in claim 1, further comprising a delay time adjustment means for adjusting delay time of various wave form data.

3. An apparatus as claimed in claim 1, wherein said recording arrangement further comprises:
character data extraction means for extracting digital character data carried in a vertical blanking period of said video signal, said digital character data having a maximum level expressed in n-bits; and
second conversion means for converting said digital character data to a quantized character data having a maximum level expressed in m-bits, in which m is less than n;
and wherein said reproducing arrangement further comprises:
character data selecting means for selecting said quantized character data; and
second counter conversion means for converting said quantized character data of m-bits to said digital character data of n-bits.

4. An apparatus as claimed in claim 1, wherein said recording arrangement further comprises:
copy number data extraction means for extracting digital copy number data carried in a vertical blanking period of said video signal, said digital copy number data having a maximum level expressed in n-bits; and
third conversion means for converting said digital copy number data to a quantized copy number data having a maximum level expressed in m-bits, in which m is less than n;
and wherein said reproducing arrangement further comprises:
copy number data selecting means for selecting said quantized copy number data; and
third counter conversion means for converting said quantized copy number data of m-bits to said digital copy number data of n-bits.

5. An apparatus as claimed in claim 1, wherein said digital copy number data is following by a synchronization level signal.

6. An apparatus for reproducing a non-character digital video signal containing a predetermined number of different quantized wave form data having m-bits, said apparatus comprising:
reproducing processing means for reproducing said non-character digital video signal from a recording medium;
selecting means for selecting said predetermined number of different quantized wave form data;
counter conversion means for converting said predetermined number of different quantized wave form data to a non-character digital wave form data of n-bits, said non-character digital wave form data having a predetermined number of different levels; and
adder means for adding said non-character digital wave form data in a vertical blanking period of said non-character digital video signal.

7. An apparatus for recording and reproducing a video signal comprising:
(I) recording arrangement comprising:
analog-to-digital conversion means for converting analog video signal to digital video signal;
wave form data extraction means for extracting non-character digital wave form data having a predetermined number of different levels carried in a vertical blanking period of said video signal, said non-character digital wave form data having a maximum level expressed in n-bits;
conversion means for converting said non-character wave form data to one of a predetermined number of different quantized wave form data having a maximum level expressed in m-bits, in which m is not greater than n; and
recording processing means for recording the video signal on a specified area of a recording medium in a predetermined format and said predetermined number of different quantized wave form data on another area of the recording medium in another predetermined format, the recorded predetermined number of different quantized wave form data is less than non-character wave form data in a blanking period of said analog video signal; and (II) reproducing arrangement comprising:
reproducing processing means for reproducing said video signal from said specified area of said recording medium and non-video data from said another area of said recording medium;
wave form data selecting means for selecting said predetermined number of different quantized wave form data from said non-video data;
counter conversion means for converting said predetermined number of different quantized wave form data of m-bits to said non-character digital wave form data of n-bits; and
adder means for adding said non-character digital wave form data in a vertical blanking period of said video signal.

8. An apparatus for reproducing a video signal recorded in a specified area in a predetermined format and a non-character digital video signal having m-bits recorded in another area in another predetermined format, said non-character digital video signal containing a predetermined number of different quantized wave form data, said apparatus comprising:
reproducing processing means for reproducing said video signal from said specified area of said recording medium and the non-character digital video signal from said another area of said recording medium;
selecting means for selecting said predetermined number of different quantized wave form data;
counter conversion means for converting said predetermined number of different quantized wave form data to a non-character digital wave form data of n-bits, said non-character digital wave form data having a predetermined number of different levels; and
adder means for adding said non-character digital wave form data in a vertical blanking period of said non-character digital video signal.

\* \* \* \* \*

UNITED STATES PATENT AND TRADE MARK OFFICE
CERTIFICATE OF CORRECTION

PATENT NO. : 5,486,930
DATED : January 23, 1996
INVENTOR(S) : IKETANI ET AL.

It is certified that error appears in the above-identified patent and that said Letters Patent is hereby corrected as shown below:

On the Cover Page, item [56] References Cited, insert
--4,353,098  10/1982  Heinz et al.--.

Signed and Sealed this

Thirteenth Day of August, 1996

Attest:

BRUCE LEHMAN

*Attesting Officer*      *Commissioner of Patents and Trademarks*